(12) United States Patent
Sanders et al.

(10) Patent No.: US 12,485,517 B2
(45) Date of Patent: Dec. 2, 2025

(54) AUTOMATED CAVITATION PROCESSING

(71) Applicant: The Boeing Company, Chicago, IL (US)

(72) Inventors: Daniel Gordon Sanders, Cle Elum, WA (US); Kandaudage Channa Ruwan De Silva, Summerville, SC (US)

(73) Assignee: The Boeing Company, Arlington, VA (US)

( * ) Notice: Subject to any disclaimer, the term of this patent is extended or adjusted under 35 U.S.C. 154(b) by 608 days.

(21) Appl. No.: 17/541,190

(22) Filed: Dec. 2, 2021

(65) Prior Publication Data
US 2023/0173642 A1 Jun. 8, 2023

(51) Int. Cl.
B24C 7/00 (2006.01)
B24C 3/08 (2006.01)
B24C 9/00 (2006.01)

(52) U.S. Cl.
CPC ............ *B24C 7/0038* (2013.01); *B24C 3/085* (2013.01); *B24C 9/003* (2013.01)

(58) Field of Classification Search
CPC ......... B24C 7/0038; B24C 3/085; B08B 3/02; B08B 3/022; B64F 5/30
See application file for complete search history.

(56) References Cited

U.S. PATENT DOCUMENTS

| | | |
|---|---|---|
| 3,807,632 A | 4/1974 | Johnson, Jr. |
| 4,342,425 A | 8/1982 | Vickers |
| 4,449,331 A * | 5/1984 | MacMillan ............... B24C 3/00 451/88 |
| 4,474,251 A | 10/1984 | Johnson, Jr. |
| 5,316,591 A | 5/1994 | Chao et al. |
| 5,522,941 A | 6/1996 | Uchinami et al. |
| 5,778,713 A | 7/1998 | Butler et al. |
| 6,280,302 B1 | 8/2001 | Hashish et al. |
| 6,341,151 B1 | 1/2002 | Enomoto et al. |
| 6,425,276 B1 | 7/2002 | Hirano et al. |
| 6,855,208 B1 | 2/2005 | Soyama |

(Continued)

FOREIGN PATENT DOCUMENTS

| | | |
|---|---|---|
| CN | 101670556 A | 3/2010 |
| CN | 102430987 A | 5/2012 |

(Continued)

OTHER PUBLICATIONS

Korean Intellectual Property Office, Office Action regarding Korean Patent Application No. 10-2018-0102673, dated Nov. 14, 2022, 13 pages.

(Continued)

*Primary Examiner* — Marc Lorenzi
(74) *Attorney, Agent, or Firm* — Kolitch Romano Dascenzo Gates LLC

(57) ABSTRACT

An apparatus for treating a surface of an object is disclosed, including a carrier configured to transport the object through a treatment zone and an array of nozzle devices, each nozzle device positioned to deliver a cavitating jet into the treatment zone. The apparatus further includes a fluid source, a pump connected to the fluid source, and a hose configured to carry fluid under high pressure generated by the pump from the fluid source to the array of nozzle devices.

20 Claims, 4 Drawing Sheets

(56) References Cited

U.S. PATENT DOCUMENTS

| | | | |
|---|---|---|---|
| 6,993,948 | B2 | 2/2006 | Offer |
| 7,494,073 | B2 | 2/2009 | Pivovarov |
| 8,833,444 | B2 | 9/2014 | McAfee et al. |
| 9,050,642 | B2 | 6/2015 | Alberts et al. |
| 9,200,341 | B1 | 12/2015 | Sanders et al. |
| 9,433,986 | B2 | 9/2016 | Ogawa et al. |
| 9,573,246 | B2 | 2/2017 | Maeguchi et al. |
| 9,739,695 | B2 | 8/2017 | Michishita et al. |
| 10,233,511 | B1 | 3/2019 | Sanders et al. |
| 10,265,833 | B2 | 4/2019 | Sanders et al. |
| 10,836,012 | B2 | 11/2020 | Sanders |
| 2002/0098776 | A1 | 7/2002 | Dopper |
| 2004/0187891 | A1 | 9/2004 | Chou et al. |
| 2004/0235389 | A1 | 11/2004 | Hashish et al. |
| 2005/0017090 | A1 | 1/2005 | Pivovarov |
| 2005/0139697 | A1 | 6/2005 | Pivovarov |
| 2006/0151634 | A1 | 7/2006 | Pivovarov |
| 2008/0060676 | A1* | 3/2008 | Scranton ............... B08B 3/10 134/2 |
| 2010/0255759 | A1 | 10/2010 | Ohashi et al. |
| 2012/0118562 | A1 | 5/2012 | McAfee et al. |
| 2013/0284440 | A1 | 10/2013 | McAfee et al. |
| 2018/0283209 | A1* | 10/2018 | Eriksen ............... B08B 3/02 |
| 2019/0061103 | A1 | 2/2019 | Sanders |
| 2019/0061104 | A1 | 2/2019 | Sanders et al. |
| 2019/0062858 | A1* | 2/2019 | Sanders ............... B24C 5/04 |
| 2019/0308292 | A1 | 10/2019 | Nagalingam et al. |
| 2020/0189068 | A1 | 6/2020 | Sanders |
| 2021/0387309 | A1 | 12/2021 | Sanders et al. |
| 2022/0161387 | A1* | 5/2022 | Yeo ............... B24B 19/14 |
| 2022/0211244 | A1 | 7/2022 | An |
| 2023/0173641 | A1 | 6/2023 | Sanders et al. |

FOREIGN PATENT DOCUMENTS

| | | |
|---|---|---|
| CN | 102649994 A | 8/2012 |
| CN | 104440584 A | 3/2015 |
| CN | 205438241 U | 8/2016 |
| CN | 106392863 A | 2/2017 |
| DE | 60031257 T2 | 2/2007 |
| DE | 102006037069 A1 | 2/2007 |
| DE | 60030341 T2 | 8/2007 |
| EP | 0450222 A2 | 10/1991 |
| EP | 1500712 B1 | 8/2006 |
| EP | 1170387 B1 | 10/2006 |
| EP | 2546026 A1 | 1/2013 |
| EP | 2736678 B1 | 9/2015 |
| IN | 103415358 A | 11/2013 |
| JP | H04362124 A | 12/1992 |
| JP | H0647667 A | 2/1994 |
| JP | H06047672 A | 2/1994 |
| JP | H07328855 A | 12/1995 |
| JP | H07328857 A | 12/1995 |
| JP | H07328859 A | 12/1995 |
| JP | H07328860 A | 12/1995 |
| JP | H0871919 A | 3/1996 |
| JP | H0890418 A | 4/1996 |
| JP | 2003062492 A | 3/2003 |
| JP | 3127847 U | 12/2006 |
| JP | 2007075958 A | 3/2007 |
| JP | 2007-260550 A | 10/2007 |
| JP | 4240972 B2 | 3/2009 |
| JP | 2009090443 A | 4/2009 |
| JP | 2011-245582 A | 12/2011 |
| JP | 2012230253 A | 11/2012 |
| JP | 2013082030 A | 5/2013 |
| JP | 5578318 A | 8/2014 |
| JP | 5876701 B2 | 3/2016 |
| JP | 2016221650 A | 12/2016 |
| WO | 9528235 A1 | 10/1995 |
| WO | 2009154567 A1 | 12/2009 |
| WO | 2012157619 A1 | 11/2012 |
| WO | 2013019317 A1 | 2/2013 |
| WO | 2016131483 A1 | 8/2016 |

OTHER PUBLICATIONS

U.S. Patent and Trademark Office, Final Office Action regarding U.S. Appl. No. 17/552,956, dated Aug. 3, 2023, 25 pages.

European Patent Office, Extended European Search Report regarding European Patent Application No. 23175272.6 dated Nov. 20, 2023, 11 pages.

Chahine, Georges L., et al., "Cleaning and Cutting with Self-Resonating Pulsed Water Jets", 2nd US Water Jet Conference, 1983, pp. 195-207.

Vijay, M., et al., "A study of the practicality of cavitating water jets", Jet Cutting Technology, 1992, vol. 13, pp. 75-99.

Soyama, et al., Use of Cavitating Jet for Introducing Compressive Residual Stress, Article in Journal of Manufacturing Science and Engineering, vol. 22, Feb. 2000, 7 pages.

Macian, V., et al., "A CFD analysis of the influence of diesel nozzle geometry on the inception of cavitation", Atomization and Sprays, 2003, vol. 13, pp. 579-604.

Payri, Raul, et al. "A study of the relation between nozzle geometry, internal flow and sprays characteristics in diesel fuel injection systems", KSME International Journal, 2004, vol. 18, No. 7, pp. 1222-1235.

Desantes, J., et al., "Experimental characterization of outlet flow for different diesel nozzle geometries", 2005, No. 2005-01-2120, SAE Technical Paper, 10 pages.

Turski, et al., Engineering the residual stress state and microstructure of stainless steel with mechanical surface treatments, Article for Springer-Verlag, May 11, 2010, 8 pages.

Hattori, Shuji, et al., "Prediction method for cavitation erosion based on measurement of bubble collapse impact loads." Wear 269.7-8 (2010), published online Jun. 25, 2010: pp. 507-514.

Takakuwa, Osamu, et al., "Suppression of hydrogen-assisted fatigue crack growth in austenitic stainless steel by cavitation peening." International journal of hydrogen energy 37.6 (2012), published online Jan. 2, 2012: pp. 5268-5276.

Soyama, Hitoshi, "Effect of nozzle geometry on a standard cavitation erosion test using a cavitating jet." Wear 297.1-2 (2013), published online Nov. 15, 2012: pp. 895-902.

Patella, Regiane Fortes, et al., "Mass loss simulation in cavitation erosion: Fatigue criterion approach." Wear 300.1-2 (2013), published online Feb. 13, 2013: pp. 205-215.

Mitelea, Ion, et al. "Ultrasonic cavitation erosion of nodular cast iron with ferrite-pearlite microstructure." Ultrasonics Sonochemistry 23 (2015), published online Nov. 10, 2014: pp. 385-390.

Li, Deng, et al., "Effects of nozzle inner surface roughness on the cavitation erosion characteristics of high speed submerged jets." Experimental Thermal and Fluid Science 74 (2016), published online Jan. 28, 2016: pp. 444-452.

Sato, et al., Using Cavitation Peening to Improve the Fatigue Life of Titanium Alloy Ti-6A1-4V Manufactured by Electron Beam Melting, Article for Scientific Research Publishing, Apr. 20, 2016, 11 pages.

Deng, Li et al., "Experimental study on the effect of feeding pipe diameter on the cavitation erosion performance of self-resonating cavitating waterjet", Experimental Thermal and Fluid Science, Elsevier, Amsterdam, NL, vol. 82, Nov. 27, 2016, pp. 314-325.

Marcon, Andrea, Water Cavitation Peening for Aerospace Materials—A Dissertation Presented to the Academic Faculty at The Georgia Institute of Technology, Jan. 2017, 211 pages.

Tan, K.L., et al. Surface Modification of Additive Manufactured Components by Ultrasonic Cavitation Abrasive Finishing, Wear, 378-379, 2017, 90-95 pg, Singapore.

U.S. Patent and Trademark Office, Office action regarding U.S. Appl. No. 15/693,409, dated May 30, 2018, 11 pages.

U.S. Patent and Trademark Office, Office action regarding U.S. Appl. No. 15/693,417, dated May 30, 2018, 10 pages.

European Patent Office, Extended European Search Report in European Patent Application No. 18190086.1, dated Feb. 5, 2019, 7 pages.

European Patent Office, Extended European Search Report in European Patent Application No. 18189818.0, dated Feb. 6, 2019, 10 pages.

(56) References Cited

OTHER PUBLICATIONS

European Patent Office, Extended European Search Report in European Patent Application No. 18190518.3, dated Feb. 6, 2019, 12 pages.
European Patent Office, Examination Report regarding European Patent Application No. 18190086.1, dated Jul. 30, 2019, 4 pages.
European Patent Office, Examination Report regarding European Patent Application No. 18189818.0, dated Oct. 24, 2019, 4 pages.
Tan, K. L., et al., "Surface finishing on IN625 additively manufactured surfaces by combined ultrasonic cavitation and abrasion." Additive Manufacturing 31 (2020) 100938, published online Nov. 6, 2019, 22 pages.
U.S. Patent and Trademark Office, Non-Final Office Action regarding U.S. Appl. No. 15/693,401, dated Nov. 15, 2019, 20 pages.
Ma, Wei, et al., "Experimental Research on the Waterjet Oscillating Characteristics of Helmholtz Nozzle", Journal of Applied Science and Engineering, 2019, vol. 22, No. 1, pp. 83-92.
European Patent Office, Communication Pursuant to Article 94(3) EPC regarding European Patent Application No. 18190086.1, dated May 7, 2020, 4 pages.
Campo, Frank, et al. "SERDP & ESTCP Webinar Series: Reducing Hazardous Materials in Weapons Systems: Advances in Waterjet Applications and Cold Spray Technologies" video, retrieved from the internet on Jan. 6, 2021, from www.serdp-estcp.org/Tools-and-Training/Webinar-Series/09-10-2020, published Sep. 10, 2020, 2 pages.
European Patent Office, Examination Report regarding European Patent Application No. 18189818.0 dated Jan. 12, 2021, 5 pages.
The State Intellectual Property Office of P.R.C., First Office Action and Search Report regarding Chinese Patent Application No. 2018109918271, dated Mar. 30, 2021, 18 pages.
The State Intellectual Property Office of P.R.C., First Office Action and Search Report regarding Chinese Patent Application No. 2018109917851, dated Jun. 2, 2021, 17 pages.
European Patent Office, Examination Report regarding European Patent Application No. 18190518.3, dated Jun. 21, 2021, 6 pages.
European Patent Office, Extended European Search Report in European Patent Application No. 21178917.7, dated Nov. 8, 2021, 10 pages.

* cited by examiner

AUTOMATED CAVITATION PROCESSING

BACKGROUND

Cavitation peening and Cavitation Abrasive Surface Finishing (CASF) are promising new treatment methods for a variety of manufactured metal parts. Cavitation bubbles are formed in a fluid by a transition to gas phase resulting from an increase in flow velocity and internal energy, then collapse as the flow velocity and pressure surrounding the bubbles dissipates and the gas transitions back to a fluid state. When a cavitation bubble collapses, a micro-jet is produced that can peen a surface on impact and/or energize particles of an abrasive material sufficiently that particle impact removes material from the surface.

Cavitation processes can be cheaper, safer, faster, and have a lower environmental impact than previous methods of peening, cleaning, and smoothing surfaces. Inexpensive water and inert abrasives can be used in place of expensive and potentially dangerous shot media, chemical cleaners, or acids. However, currently used cavitation processing systems are generally configured for manual treatment of individual parts, and are appropriate only for lab-based research and prototyping. Cavitation processing systems appropriate for automated high-throughput are needed to realize the advantages of these processes on a mass production scale.

SUMMARY

The present disclosure provides systems, apparatus, and methods relating to automated cavitation peening and abrasive surface finishing. In some examples, an apparatus for treating a surface of an object may include a carrier configured to transport the object through a treatment zone and an array of nozzle devices, each nozzle device positioned to deliver a cavitating jet into the treatment zone. The apparatus may further include a fluid source, a pump connected to the fluid source, and a hose configured to carry fluid under high pressure generated by the pump from the fluid source to the array of nozzle devices.

In some examples, a cavitation peening system may include a plurality of cavitation nozzles directed toward a treatment zone, a rack configured to support and releasably secure a workpiece, a mechanical manipulation device connected to the rack, and a controller. The plurality of cavitation nozzles may be connected by high pressure hoses to a high pressure fluid pump, and the mechanical manipulation device may be configured to move the rack and the secured workpiece into the treatment zone. The controller may be electronically connected to the high pressure fluid pump and the mechanical manipulation device, and the controller may coordinate supply of a high pressure fluid from the high pressure fluid pump to the plurality of cavitation nozzles and movement of the rack by the mechanical manipulation device to achieve cavitation peening of the secured workpiece.

In some examples, an automated cavitation peening system may include a first array of cavitation nozzles positioned along a first side of a treatment zone, a second array of cavitation nozzles positioned along a second, opposing side of the treatment zone, and a fluid supply including a pump connected to at least a first and a second manifold and supplying high pressure fluid to the first array of cavitation nozzles and the second array of cavitation nozzles. The cavitation nozzles of the first and second arrays may be directed toward the treatment zone. The system may further include a movable hanger configured to support one or more workpieces during cavitation peening, and a controller regulating the supply of high pressure fluid and directing movement of the movable hanger. The movable hanger may carry the supported workpiece(s) along a path through the work area, between the first and second sides.

Features, functions, and advantages may be achieved independently in various examples of the present disclosure, or may be combined in yet other examples, further details of which can be seen with reference to the following description and drawings.

DETAILED DESCRIPTION

Various aspects and examples of an automated cavitation processing system, as well as related methods, are described below and illustrated in the associated drawings. Unless otherwise specified, an automated cavitation processing system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

In general, an automated cavitation processing system in accordance with the present teachings may include a plurality of cavitation nozzles directed toward a treatment zone or work area. The nozzles may be supplied with a high-pressure fluid and either disposed in a tank filled with fluid or supplied with a low-pressure fluid. A workpiece may be moved through the treatment zone by a carrier. A controller may be operatively connected to both the fluid supply for the nozzles and the carrier such that the workpiece can be automatically processed. The controller may activate the nozzles and move the workpiece through a predetermined sequence based on the part geometry and desired peening and/or surface finishing.

Figure 1:
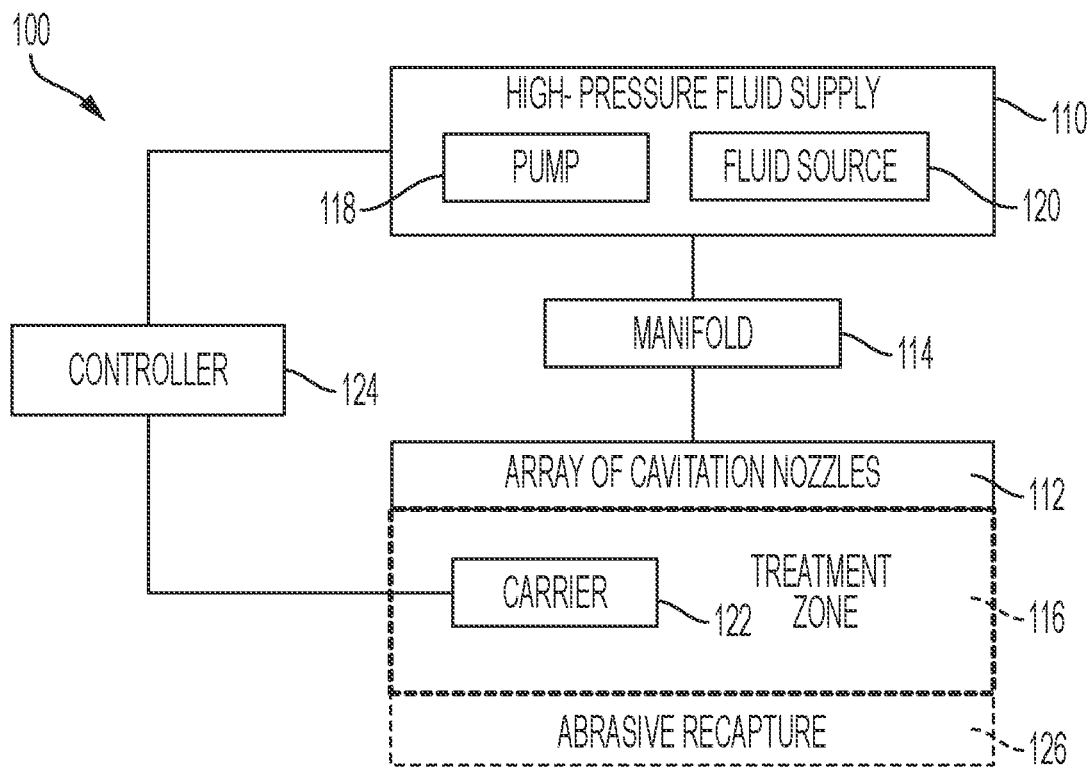
FIG. 1 is a schematic diagram of an illustrative automated cavitation processing system in accordance with aspects of the present disclosure.

FIG. 1 is a schematic diagram of an example of a cavitation processing system 100, which may also be described as an automated cavitation peening system. The system includes a fluid supply 110 and an array of cavitation nozzles 112. The fluid supply is connected to the array of cavitation nozzles by at least one manifold 114. In some examples, system 100 may include high-pressure hoses and a diaphragm of piping connected to a plurality of high-pressure manifolds to supply fluid to the array of cavitation nozzles. Nozzle array 112 may include a support structure configured to hold the nozzles in a selected position and orientation relative to a treatment zone 116.

Each nozzle of array 112 may be directed toward treatment zone 116. In some examples, the support structure for the nozzles may be passively adjustable to allow repositioning and/or may be equipped for active movement to allow dynamic treatment. For instance, the support structure may include articulated joints and/or may include one or more robotic arms. Nozzle array 112 may be arranged relative to treatment zone 116 according to desired treatment. System 100 may include any number, pattern, combination, and/or arrangement of cavitation nozzles and/or arrays of cavitation nozzles. Examples of nozzle layouts for system 100 are described further below, with reference to FIG. 2. Nozzle arrays may be adjustable for customizing treatment for particular workpieces.

Fluid supply 110 includes a high-pressure fluid pump 118 and a fluid source 120, configured to deliver high-pressure fluid to array of cavitation nozzles 112. For example, fluid source 120 may be a water tank or a connection to a municipal water supply, and pump 118 may be configured for high-pressure operation. Fluid supply 110 may also include one or more additional pumps and/or fluid sources, according to a selected processing method or methods. For example, the fluid supply may include a pump configured for low-pressure operation and/or may include a supply of an abrasive slurry, for use with co-flow cavitation nozzles and/or for abrasive surface finishing.

High-pressure fluid from fluid supply 110 may be dispensed from array of cavitation nozzles 112 into treatment zone 116 as cavitating jets. The cavitating jets may interact with a liquid environment of the zone, such as a water-filled tank, or with a concentric low-pressure jet of fluid to form a cloud of cavitation bubbles. In some examples, the cavitation bubbles may excite particles of an abrasive suspended in the liquid environment of the treatment zone or suspended in the concentric low-pressure jet of fluid. A workpiece in the treatment zone may be thereby peened and surface finished.

Any desired fluid may be used for cavitation. Water may be preferred, as an inexpensive fluid that is safe and easy to work with. De-ionized water may be used to prolong the life of components. Properties such as viscosity of the fluid used may affect collapsing force of cavitation bubbles and a fluid may be chosen to improve impact, or decrease the pressure required for a desired impact level. The fluid may also be selected according to properties of the abrasive material used, and/or to achieve desired properties of an abrasive slurry.

Any effective abrasive material or mixture of materials may be used. For example, the abrasive material may include metal, glass, ceramic, silica oxide, aluminum oxide, yttrium, garnet, pumice, nut shells, corn cob, and/or plastic particles. For another example, the abrasive material may include natural or synthetic rubber, silicon, fluoropolymer, elastomer, Viton, Teflon, and/or a Fullerene based carbon nano-material particles. All particles may preferably be within a range of approximately 16 to 1200 ANSI grit size.

System 100 further includes a carrier 122 to support and transport a workpiece. The carrier is configured to releasably secure the workpiece, and move the workpiece into and out of treatment zone 116. Carrier 122 may include a manipulation device and a hanger, rack, or other material handing device configured to support the workpiece. Carrier 122 may be configured according to a size, weight, and geometry of the workpiece, as well as according to a desired treatment sequence. For example, a conveyer belt may be selected for stable parts with limited height, for treatment requiring only horizontal movement. For another example, a Computer Numerical Control (CNC) arm may be selected for limited weight parts of complex geometry, for treatment requiring positioning at a plurality of precise angles. For another example, a movable hanger and overhead track may be selected for large, heavy parts.

A controller 124 is operatively connected to fluid supply 110 and carrier 122. In examples where the support structure for array of cavitation nozzles 112 includes active movement control, the controller may also be operatively connected to the nozzle support structure. Controller 124 may include any programmable logic controller (PLC) system and/or digital processing system configured for automation of system 100, such as PLC system 400, described below.

Controller 124 may be programmable by a user with a desired treatment sequence or treatment procedure. The controller may be operable to actuate control valves of fluid supply 110 to initiate generation of cavitation bubble clouds in treatment zone 116 by array of cavitation nozzles 112, and to modulate supplied pressure, flow rate, temperature, or other parameters relevant to cavitation intensity. The controller may receive data regarding such parameters from one or more sensors located in fluid supply 110, nozzles of array 112, treatment zone 116, on carrier 122, or on the workpiece.

Controller 124 may be further operable to control movement of carrier 122 in treatment zone 116. The controller may coordinate initiation of fluid flow from nozzles of array 112 with movement of the carrier. Controller 124 may direct carrier 122 through a predetermined sequence of movements, including movements such as entering treatment zone 116, moving forward and backward and/or up and down relative to array of nozzles 112 at a selected rate, remaining still for a selected time period, and/or rotating through selected angles.

In examples where system 100 is configured for abrasive surface finishing, the system may further include an abrasive re-capture system 126. Re-capture system 126 may be integrated with fluid supply 110 and/or an auxiliary system. Re-capture system 126 may collect previously dispensed abrasive media that was expended during treatment and/or settled out of suspension in an abrasive slurry. The re-capture system may include one or more of an overflow tank, a drain, a pump, a vacuum, and an autonomous vehicle.

Re-capture system 126 may further include a filter or filtration system to separate out depleted abrasive. What remains of the collected abrasive media may be returned to fluid supply 110 or an abrasive supply for reincorporation into an abrasive slurry and re-use. For example, the remaining abrasive may be reintroduced into a tank of treatment zone 116, or may be re-mixed in a slurry source of the fluid supply. In some examples, recapture, reintroduction and/or re-mixing of abrasives may be regulated by controller 124.

Figure 2:
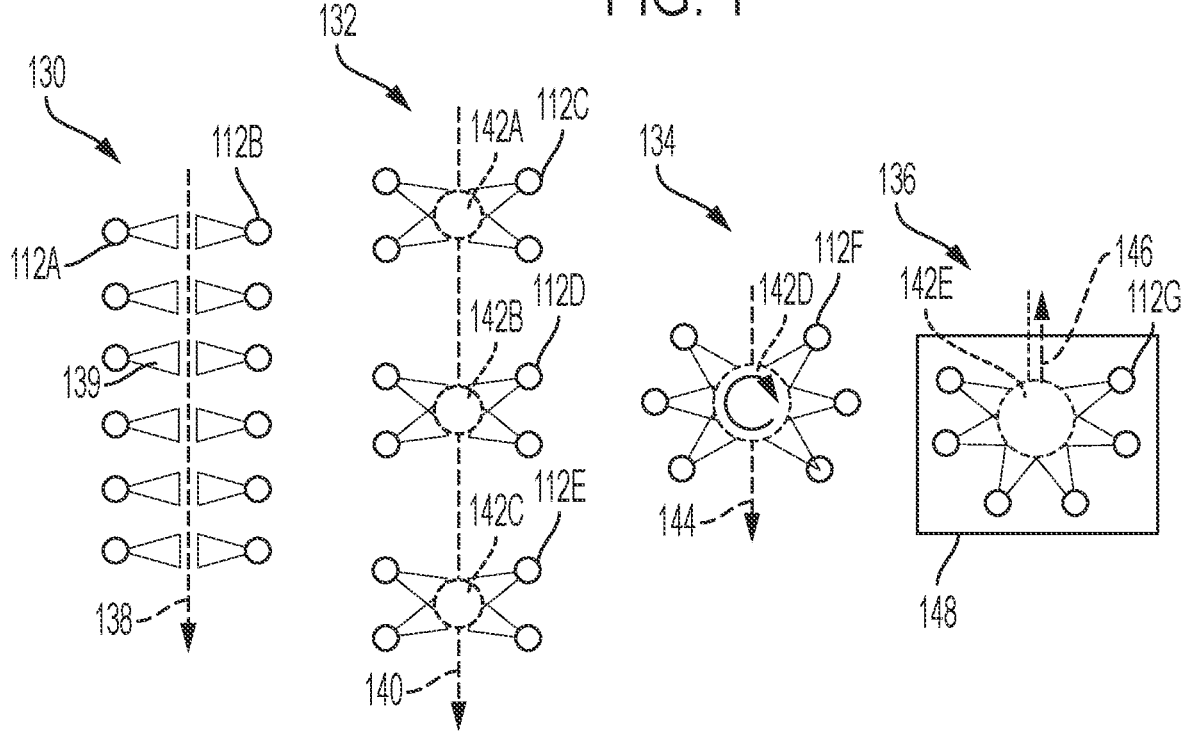
FIG. 2 is a schematic diagram of four example layouts for the system of FIG. 1.

FIG. 2 is a schematic diagram of four illustrative nozzle layouts for system 100, including a linear layout 130, a station layout 132, a rotational layout 134, and a booth layout 136. In any layout, one or more arrays of cavitation nozzles 112 may be arranged relative to treatment zone 116, which may be contiguous or include multiple discrete regions. Each array of nozzles may have a separate fluid supply, all arrays may share a common fluid supply, and/or any effective combination thereof. Each fluid supply may be separately controlled and/or linked to a single controller. Preferably all fluid supply controls may be at least interconnected, to facilitate coordinated treatment.

Linear layout 130 includes a first array of cavitation nozzles 112A positioned on a first side of treatment zone 116, which is defined by a linear treatment path 138. A second array of cavitation nozzles 112B is positioned on a second, opposite side of treatment zone 116 and path 138. That is, first array of cavitation nozzles 112A and second array of cavitation nozzles 112B are positioned on opposing sides of the treatment zone. Each nozzle of the arrays is directed toward linear treatment path 138, such that a generated cavitation cloud 139 is an appropriate distance for desired treatment of a workpiece travelling the treatment path.

The controller may be programmed with a movement sequence matching linear layout 130. For example, the controller may be programmed to move the carrier continuously and at a constant speed, horizontally along linear treatment path 138. Layout 130 may be used for any type of treatment and/or workpiece, but may be particularly appropriate to workpieces having a generally flat or planar shape, or that may be described as comprising primarily first and second opposing surfaces.

Station layout 132 includes three arrays of cavitation nozzles 112C, 112D, and 112E, positioned at three stations 142A, 142B, 142C of a linear treatment path 140. More specifically, array 112C is positioned at station 142A, with two nozzles on either side of linear treatment path 140. All four nozzles of array 112C are directed toward station 142A, or a center point of the station, such that cavitation clouds 139 generated by the nozzles extend at an oblique angle relative to the linear treatment path. Such an arrangement and orientation may facilitate treatment of a front and back side of a workpiece, as defined by the workpiece's orientation relative to linear treatment path 144.

Array of cavitation nozzles 112D is similarly positioned at station 142B, and array of cavitation nozzles 112E is similarly positioned at station 142C. In some examples, each array of nozzles may be configured for different treatments and/or different treatment parameters. For instance, array 112C may be configured for and/or operated for cavitation abrasive surface finishing, array 112D may be configured and/or operated for cavitation peening, and array 112E may be configured and/or operated for high intensity peening, in order to achieve both surface smoothing and desired compressive stress in a workpiece. For another instance, each array of nozzles may dispense a slurry with a different grit size, such that the abrasive particle size decreases as the object moves through the treatment zone. That is, different stations may use abrasives of different particle sizes. For example, particle grit sizes may decrease along the treatment path for transitioning from rough to fine surface finishing. Such configuration may facilitate a finer or smoother final surface finish.

The controller may be programmed with a movement sequence matching station layout 130. For example, the controller may be programmed to move the carrier along treatment path 144 and pause at each station for a selected time period. The time periods may be selected to allow completion of treatment at each station. In examples where cavitation arrays 112C,D,E are each configured for multiple operation modes or treatment types, the movement sequence may vary according to a selected operation mode of each station for treatment of a specific workpiece. Movement timing, or pause period at a given station, may be at least partially determined by real-time received sensor data indicating an extent of surface finishing of a work piece being processed along the treatment path.

Rotational layout 134 includes a single array of cavitation nozzles 112F, positioned at one station 142D of a linear treatment path 144. Array 112F surrounds station 142D without blocking the linear treatment path, and has three nozzles on either side of the linear treatment path. All six nozzles of array 112F are directed toward station 142D, or a center point of the station, such that cavitation clouds 139 generated by the nozzles extend at an oblique angle relative to the linear treatment path. Such an arrangement and orientation may facilitate treatment of all sides of a workpiece.

The controller may be programmed with a movement sequence matching rotational layout 134. For example, the controller may be programmed to move the carrier along linear treatment path 146 to station 142D, pause, rotate the carrier and/or supported workpiece relative to array of nozzles 112F, and then continue along the linear treatment path. Layout 134 may be used for any type of treatment and/or workpiece, but may be particularly appropriate to workpieces having complex geometry and/or multiple angled surfaces requiring treatment.

Booth layout 136 includes an array of cavitation nozzles 112G positioned at a dead-end station 142E, in a booth 148. Array 112G partially surround station 142E, allowing ingress and egress to booth 148 along a treatment path 146. All six nozzles of array 112G are directed toward station 142E, or a center point of the station. Such an arrangement and orientation may facilitate treatment of all sides of a workpiece.

Booth 148 may include any appropriate structure, such as one or more walls, a tank, and/or a sealable container. The booth may be configured to contain fluid and/or abrasives used in treatment, and in some examples to aid in recovery of fluid and/or abrasives. The controller may be programmed with a movement sequence matching booth layout 136. For example, the controller may be programmed to move the carrier along linear treatment path 146 to station 142E, pause for the duration of treatment, and then return back along the linear treatment path. In an example, the carrier may deposit the workpiece in the booth prior to treatment and recover the workpiece subsequent to treatment. In such an example, the booth may be closed or sealed during treatment.

System 100 may include any one of illustrative layouts 130-136 and/or a suitable combination thereof. For example, each of stations 142A-C of layout 132 may be configured for rotational treatment according to layout 134. As noted above, one or more arrays of nozzles may be configured for adjustment and/or dynamic movement. Such nozzles may be transitioned between layouts between and/or during treatments. For example, an array of nozzles may be re-laid out for use with another type of workpiece.

The depicted illustrative layouts of FIG. 2 are only two-dimensional. In some examples, system 100 may include a three-dimensional nozzle layout. For example, nozzles may be directed at an oblique angle relative to a vertical direction, and/or nozzles may be positioned above or below the treatment zone. The depicted treatment paths are linear and two-dimensional. In some examples, nozzles may be laid out according to a nonlinear and/or three-dimensional treatment path. Such examples may facilitate effective nozzle supports, carrier limitations, or integration with other manufacturing equipment.

After treatment, at the end of treatment path 138, 140, 144, or 146, the carrier may transport a workpiece to another type of treatment, such as painting or coating. The carrier may additionally or alternatively transport the workpiece for rinsing and de-racking, or removal from the carrier. The system controller may be, may be part of, or may be linked to an overall manufacturing facility controller for automatic integration into other manufacturing processes.

Examples, Components, and Alternatives

The following sections describe selected aspects of exemplary automated cavitation processing systems as well as related apparatus and/or methods. The examples in these sections are intended for illustration and should not be interpreted as limiting the entire scope of the present disclosure. Each section may include one or more distinct examples, and/or contextual or related information, function, and/or structure.

A. Illustrative Automated Production Line Cavitation Processing System

Figure 3:
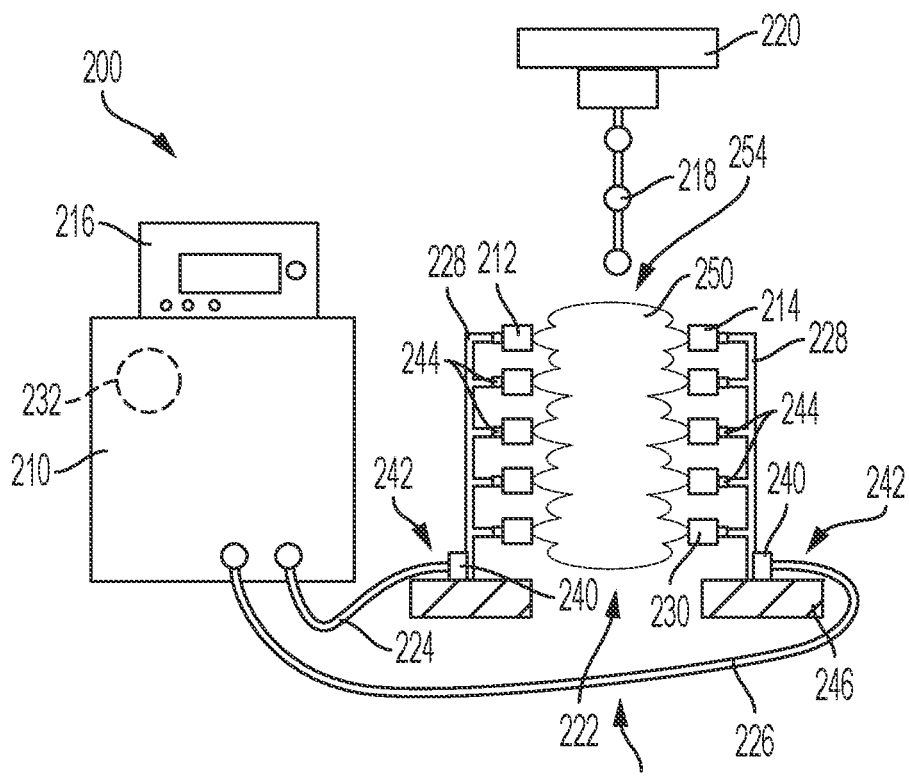
FIG. 3 is a schematic front view of another illustrative cavitation processing system.
Figure 4:
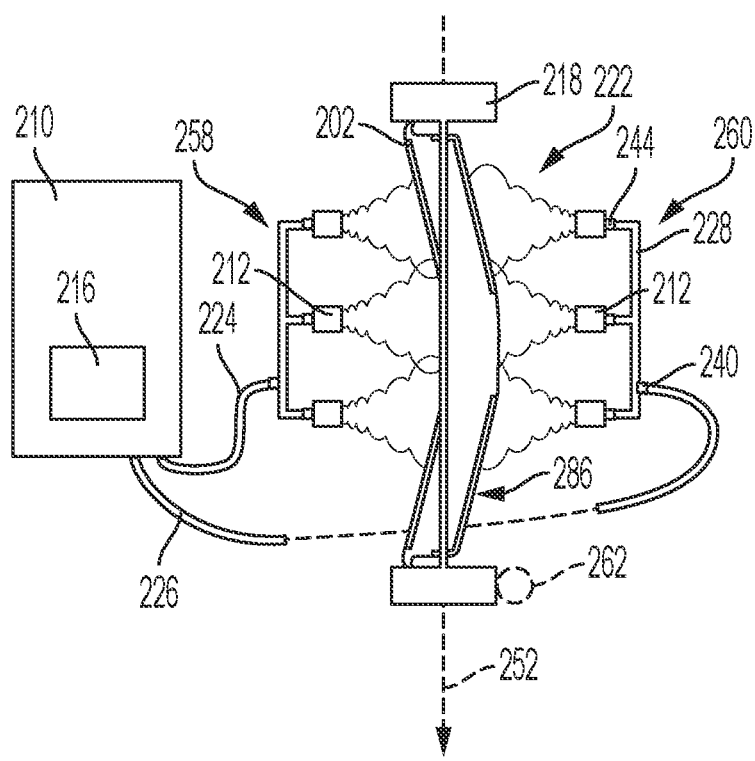
FIG. 4 is a schematic top view of the system of FIG. 3.
Figure 5:
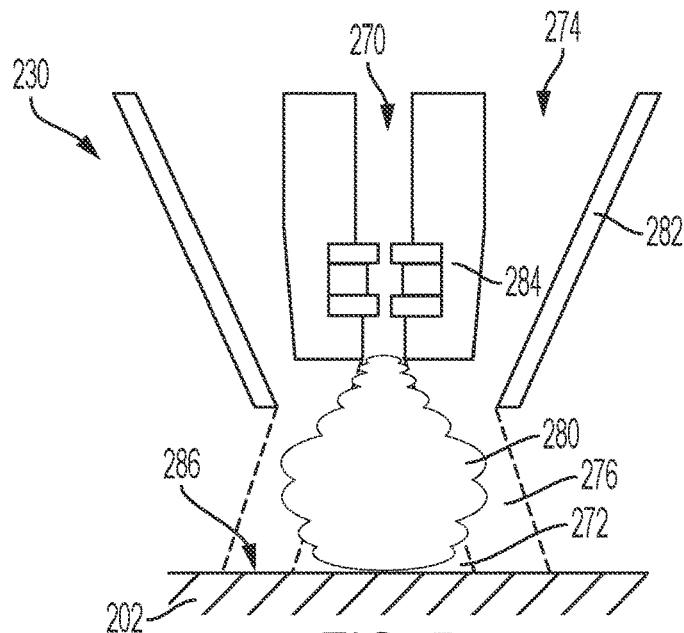
FIG. 5 is a schematic diagram of a nozzle of the system of FIG. 3.

As shown in FIGS. 3-5, this section describes an illustrative cavitation system 200. System 200 is an example of an automated cavitation processing system such as system 100, as described above. System 200 includes a fluid supply 210, a first array of cavitation nozzles 212, a second array of cavitation nozzles 214, and a controller 216. A hanger 218 on a movable support 220 is configured to transport a workpiece 202 through a treatment zone 222 between the arrays of nozzles.

Fluid supply 210 delivers high-pressure water and a low-pressure fluid to first and second arrays of cavitation nozzles 212, 214 through a first conduit 224 and a second conduit 226, respectively. Each conduit is connected to the corresponding array of cavitation nozzles by a manifold 228. Each nozzle 230 dispenses the high-pressure water and low-pressure fluid in two concentric streams, to generate a cloud of cavitation bubbles, as described further with reference to FIG. 5, below.

In the present example, fluid supply 210 includes a tank of water and two pumps which move water from the tank through conduits 224, 226. Each conduit includes two hoses, one of which is high-pressure tolerant. A first of the two pumps pressurizes water from the tank to a first pressure, for transmission through the high-pressure hose of each conduit. The first pressure may be between approximately 1,000 and 22,000 pounds per square inch (PSI), preferably about 8,000 PSI, or any pressure appropriate to produce a cavitating jet from nozzles 230.

A second of the two pumps supplies water to the other hose of each conduit 224, 226 at a second, lower pressure. The second pressure may be approximately 50 PSI, may be atmospheric pressure, or may be any pressure sufficient to generate laminar flow from nozzles 230. The higher pressure and lower pressure hoses of first conduit 224 and of second conduit 226 may be bundled, tied at intervals, enclosed in the conduit, or otherwise arranged. Electrical, data, or other cables may also be bundled with the hoses and connected to fluid supply 210 or controller 216.

In some examples, fluid supply 210 may further include a supply of abrasive media and/or a tank for storage of a slurry of abrasive media suspended in water. In such examples, the fluid supply may be configured to mix and/or maintain the slurry of water and abrasive particles at a desired saturation density. For instance, the slurry may be one-third abrasive media by volume. The second pump may supply the abrasive through the low-pressure hose of each conduit 224, 226 to each array of cavitation nozzles 212, 214, for cavitation abrasive surface finishing.

In some examples, system 200 may be configured to switch between cavitation peening and cavitation abrasive surface finishing modes. In such examples, the fluid supply may include a third pump, and each conduit 224, 226 may include a third hose for delivery of an abrasive slurry alternately with low-pressure water without abrasives. In some examples, treatment zone 222 may include and/or may be disposed in a tank of water or abrasive slurry.

The collapsing impact force of a cavitation bubble is determined in part by the pressure of the cavitating jet, the pressure of surrounding low-pressure fluid, the ratio between the two pressures, and the temperature of the water in each. To facilitate optimization of cavitation, a sensor cluster 232 is submerged in the water tank of fluid supply 210, to monitor the water for relevant parameters, including temperature, oxygen content, and contaminants. Pressure, flow rate, and/or temperature sensors may also be included in conduits 224, 226, and/or manifolds 228. Sensor data is transmitted to controller 216. The data may also be displayed by visual indicators on an exterior surface of the tank, or communicated to an operator by visual, auditory, or other means.

Fluid supply 210 may further include systems or equipment to maintain desired parameter values. For example, the supply may include a chiller and/or filter. In examples where the fluid supply stores an abrasive slurry, an additional sensor cluster may be mounted on or in the slurry tank to monitor relevant parameters such as abrasive density and suspension. In such examples, fluid supply 210 may further include systems or equipment to maintain desired abrasive slurry parameter values in a stored supply of abrasive slurry and/or in treatment area 222. For instance, the supply may include a mixer, agitator, diaphragm pump, and/or abrasive recycling system.

Manifolds 228 distribute high-pressure and low pressure water from conduits 224, 226 to arrays of cavitation nozzles 212, 214. Each manifold includes an intake valve 240 connected to a distal end 242 of a respective one of conduits 224, 226. Each manifold further includes a plurality of outtake valves 244, with each outtake in communication with a cavitation nozzle 230 of a respective one of arrays 212, 214. Manifolds 228 are configured to equally divide the distributed high-pressure and low-pressure water from the conduits, among the nozzles, such that equal pressure and flow rate are delivered to each nozzle 230. In some examples, the manifold may include one or more control valves, pressure relief valves, and/or other flow control or safety devices. Such devices may be in wired or wireless communication with controller 216.

In some examples, manifolds 228 may also provide structural support for arrays of cavitation nozzles 212, 214. In some examples, manifolds 228 may be mounted to a discrete structural support system, which may be fixed or adjustable. In the present example, each manifold includes rigid piping mounted to a fixed foundation 246 such as a floor, structural beam, or equipment structure. In some examples, foundation 246 may be movable and/or adjustable. For instance, a distance between nozzles 230 of array 212 and the nozzles of array 214 may be adjustable to accommodate workpieces of differing widths.

Nozzles 230 of arrays 212, 214 may be positioned to approximate a desired stand-off distance from a workpiece during treatment. Each nozzle generates a cavitation cloud, which together form a combined cavitation cloud 250 in treatment zone 222. Nozzles 230 may be positioned such that combined cavitation cloud 250 is centered in treatment zone 222. Combined cavitation cloud 250 and positioning of nozzles 230 may also be described as defining the treatment zone.

FIG. 3 is a front view of system 200, showing a top side 254 and a bottom side 256 of treatment zone 222. FIG. 4 is a top view of system 200, showing a left side 258 and a right side 260 of the treatment zone. First array of cavitation nozzles 212 is disposed on left side 258 of the treatment zone, and second array of cavitation nozzles 214 is disposed on right side 260 of the treatment zone. In some examples, additional nozzles or arrays of nozzles may be disposed at top side 254 and/or bottom side 256 of the treatment zone.

In the depicted example, each of arrays 212, 214 is a rectangular array of eight nozzles, arranged in three vertical columns of three, two and three nozzles respectively. For each array, all nozzles are arranged in plane with each other and each nozzle is equally spaced form all adjacent nozzles. Each array may be described as defining a plane. Each nozzle 230 is directed to dispense a cavitating jet perpendicular to the plane of the respective array. Nozzles 230 and arrays 212, 214 are positioned to form a desired shape and extent of combined cloud 250 around a treatment path 252 through treatment zone 222.

Treatment path 252 is a path through treatment zone 222 taken by a workpiece transported by movable support 220. In the present example, the treatment path is a linear path, and extends between arrays 212, 214 parallel to the plane of the arrays. Treatment path 252 is horizontal, such that the workpiece remains at a constant height as movable support 220 carries the workpiece along the treatment path.

Workpiece 202, shown in FIG. 4, is an example of a part which may be treated in system 200. System 200 may be particularly useful for treatment of large components, such as those with at least one dimension upwards of 3 feet, with a somewhat planar aspect. Workpiece 202 is a metallic jet engine inner wall part, measuring approximately 6 feet by 3 feet by 0.1 to 2 inches in overall thickness, to be peened. In some examples, workpiece 202 may comprise a titanium superplastic sandwich structure. Such titanium material oxidizes in production to form a brittle alpha case layer, which can be removed by cavitation abrasive surface finishing.

In some examples, workpiece 202 may be an additively manufactured part. Additive manufacturing methods such as directed energy deposition and powder bed melting have enabled efficient manufacturing of new components with complex shapes and features which are not practical or feasible to manufacture by previous methods. However, the resulting surface finish on products made by additive manufacturing is rougher than parts produced by traditional manufacturing methods. Electron beam powder bed melting can create a surface roughness average (Ra) over 1,000 µM, which is more than 10 times the smooth finish required for typical structural airplane components. Machining is cost-prohibitive or not possible for complex additive manufactured components, and surface finishing methods such as grit blasting, chemical milling, and shot peening do not sufficiently improve the surface roughness. Cavitation abrasive surface finishing with system 200 may allow fully automated surface smoothing of such parts, enabling full-scale production of parts using additive manufacturing methods.

Workpiece 202 is secured to hanger 218, and supported by movable support 220 (FIG. 3). The workpiece is moved through treatment zone 222 along horizontal treatment path 252, by support 220 at the direction of controller 216. The movable support may be an overhead crane, powered overhead track, or other system suitable for controlled movement of workpiece 202 at a constant speed. The movable support may be in wired or wireless communication with controller 216.

As depicted in FIG. 4, workpiece 202 has a significant curvature. Similar engine wall components may further include recesses, pan-downs, or other geometric deviations from a smooth curve or planar surface. Combined cavitation cloud 250 may be sufficiently homogenous throughout treatment zone 222, to allow reasonably uniform treatment of such surfaces of workpiece 202. That is, workpiece 202 may be evenly peened and/or finished to an evenly smooth surface. System 200 may be configured for a workpieces within a selected range of geometries, for example having below a specified curvature. The system may be re-configured or a system with another layout used to treat parts outside the selected range.

A sensor 262 is mounted on hanger 218 and in communication with controller 216, to monitor cavitation intensity during treatment. The sensor may be mounted such that the sensor is exposed to combined cavitation cloud 250. Sensor 262 may be replaceable and/or include a sacrificial component designed for regular replacement, to account for material removal by repeated exposure to cavitation processing.

Controller 216 may include a digital processing system, such as a computer or a programmable logic controller (PLC) as described in Example B, below. Any type of controller may be used, and in some examples the controller may be analog. In the present example, controller 216 includes a processor, a memory and a touch-screen display. The controller may also be accessible for input and/or output of relevant data over a digital network.

The memory of controller 216 includes a plurality of instructions executable by the processor to perform treatment of a workpiece. The instructions may be stored as a plurality of sequences or programs appropriate for a variety of treatment processes and/or workpieces. The controller may be programmed by a user of system 200 via the HMI and/or a program or programs prepared on another digital processing system may be saved to the controller memory.

Control valves, temperature controls, and other control systems are in wired or wireless communication with controller 216 to allow precise, coordinated control of pressure, flow, and temperature conditions throughout system 200. The controller is electronically connected to fluid supply 210, to activate and deactivate the pumps and adjust pressure. In some examples controller 216 may cycle water through the temperature control unit, activate or deactivate heating or cooling elements of the unit, and/or actuate delivery of abrasive media to arrays of cavitation nozzles 212, 214.

Controller 216 is also electronically connected to movable support 220, and may be programmed to control movement of hanger 218 and a secured workpiece. Each treatment program saved to the controller memory may include commands to both fluid supply 210 and movable support 220 by which the controller coordinates operation of the fluid supply and movement of the workpiece. For example, a simple treatment program may include activating the fluid supply pumps to initiate generation of combined cavitation cloud 250 at a desired intensity. The program may next include moving hanger 218 and the workpiece along treatment path 252 at a constant speed. Once movement through treatment zone 222 is complete, the program may finish by deactivating the pumps.

In some examples, controller 216 may be programmed to respond to received sensor data by altering the sequence of a treatment program. For instance, the controller may alter movement of hanger 218 through treatment zone 222 based on a parameter sensed by sensor 262. In an example, the controller may reduce speed of movement through the treatment zone in response to a detected low cavitation intensity, or increase speed of movement in response to a detected high cavitation intensity.

Controller 216 receives real-time sensor data from sensors of cluster 232 and sensor 262. Data may include fluid temperature, fluid pressure, fluid oxygen content, fluid source level, ambient temperature, vibration, ultrasonic noise, or any useful parameters. In some examples, sensor data may be communicated at regular intervals or at a request by the controller. Sensors of any type may also be mounted at any point in system 200 appropriate for collecting data. In some examples, additional sensors may be placed proximate treatment zone 222, or on a workpiece. In an example, a laser guide device may communicate measurements to controller 216 of a stand-off distance from a workpiece to the plane of array of cavitation nozzles 212 and/or 214.

Controller 216 may be configured to maintain parameters of system 200 within an acceptable operating range and/or within a selected treatment range. For example, when fluid temperature is measured as higher than acceptable, the controller may activate a cooling element of fluid supply 210 and cycle stored water through the unit. For another example, when pressure of an inner stream of a nozzle 230 is measured as lower than acceptable, the controller may adjust a pressure setting on a pump of the fluid supply. Controller 216 may also be configured to maintain a calculated quantity at an optimal level. For example, a user may program optimal cavitation intensity for a treatment sequence, and controller 216 may adjust parameters of the system as required to maintain the programmed intensity.

FIG. 5 is a schematic diagram of one of nozzles 230, discharging water toward workpiece 202. The nozzle is a co-flow nozzle, including an inner channel 270 to direct an inner stream 272 of high-pressure water, and an outer channel 274 for an outer stream 276 of low-pressure water. As described above, the water is delivered to the outer and inner channels of nozzle 230 at appropriate pressure from the fluid supply by the conduits and manifolds of the system. Nozzle 230 discharges outer stream 276 concentrically around inner stream 272, the streams coaxial along a treatment direction. Streams 276 and 272 mix to generate a cloud 280 of imploding cavitation bubbles. Inner stream 276 may also be referred to as a cavitating jet.

Outer walls 282 of co-flow nozzle 212 define outer channel 274, and surround inner channel 270. Outer walls 282 may be angled in as shown, may be parallel, or may be angled out. Inner channel 270 is defined by an inner nozzle 284 which is shown with a cavitator, spacer, and nozzle plate. Inner nozzle 284 may also have any effective geometry. For example, the nozzle may be cylindrical or conical. A preferred pressure of water for inner stream 272 may relate to the size of inner nozzle 284 and/or to the inner nozzle's design, geometry, or other properties. Pressure for outer stream 276 may preferably be sufficient for laminar flow of the outer stream.

Cavitation intensity experienced by a treatment surface 286 may depend on a stand-off distance of nozzle 230 from the surface, and therefore it may be desirable to maintain the stand-off distance within a selected range. It should be noted that in the pictured example cavitation cloud 280 extends only about halfway to treatment surface 286, as cavitation impact may be more effective beyond the cavitation cloud itself.

For cavitation abrasive surface finishing, outer stream 276 may comprise a slurry of water and abrasive media. Particles of the abrasive may be excited and energized by collapse of the bubbles of cloud 280. As the mixture of bubbles and particles contacts surface 286 of workpiece 202, the particles may impact the surface and remove material. That is, the abrasive particles may be acted on by the high forces of the cavitation cloud to smooth surface 286. Normal cavitation peening may also occur, as the cavitation bubbles interact directly with surface 286. The surface may be thereby peened, improving residual stress and fatigue strength, and cleaned, ready for painting or use.

B. Illustrative Programmable Logic Controller

Figure 6:
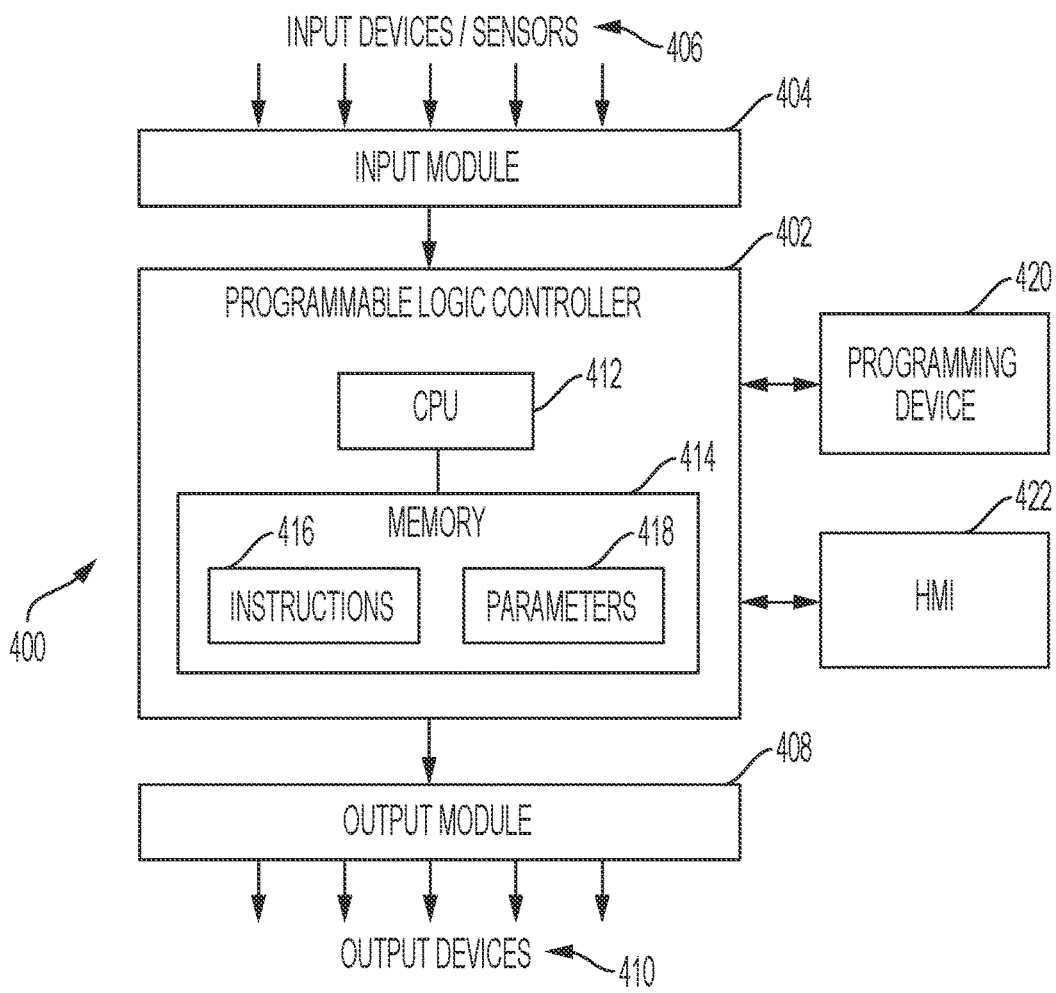
FIG. 6 is a schematic diagram of an illustrative programmable logic controller system.

As shown in FIG. 6, this section describes an illustrative programmable logic controller system 400 (also referred to as a PLC system) suitable for implementing aspects of cavitation processing system controls in accordance with aspects of the present disclosure. PLC system 400 is a programmable controller used for automation of typical industrial processes, and is an example of a data processing system. The role of a PLC system may be filled by other examples of data processing systems such as a computer, mobile device, and/or networked server. In some examples, devices that are examples of a programmable logic controller system may be included in an automated cavitation peening and/or cavitation abrasive surface finishing system.

In this illustrative example, PLC system 400 includes a programmable logic controller (PLC) 402, also referred to as a controller. PLC 402 includes a central processing unit (CPU) 412, and a memory 414 for storing instructions 416 and parameters 418 necessary to carry out the relevant automation tasks.

Central processing unit 412 serves to execute software programs in the form of instructions 416. The software programs may be loaded into memory 414. Memory 414 may also store parameters 418 needed for operation. A programming device 420 may interface with PLC 402 to facilitate the input of instructions and settings and/or to monitor equipment operation. Programming device 420 may include, for example, a handheld computer or personal computer.

A human machine interface (HMI) 422 may also be placed in communication with PLC 402. HMI 422 facilitates a user-friendly and interactive interface with the system processes and controls. Human machine interface 422 may also assist an operator in determining machine conditions, in changing machine settings, and/or displaying faults.

PLC system 400 includes an input module 404 in receiving communication with one or more input devices/sensors 406, and an output module 408 in outgoing communication with one or more output devices 410. Input devices 406 may include for example sensor cluster 232 and sensor 262 as described above. Output devices 410 may include for example fluid supply 210 and movable support 220 as described above.

Both modules 404 and 408 are hardware devices in communication with PLC 402. In some examples, communication with PLC 402 may be carried out via an optical (or otherwise wireless) interface, such that PLC 402 is electrically isolated from the input and output modules.

Input module 404 may convert analog signals from input devices/sensors 406 into digital and/or logic signals that the PLC can use. Signal types may be digital or analog. With these signals the CPU may evaluate the status of the inputs. Upon evaluating the input(s), along with known output states and stored program parameters and instructions, the CPU may execute one or more predetermined commands to control the one or more output devices. Output module 408 may convert control signals from the CPU into digital or analog signals which may be used to control the various output devices.

HMI 422 and programming device 420 may provide for communications with other data processing systems or devices, e.g., through the use of physical and/or wireless communications links.

Modules 404 and 408 allow for input and output of data with other devices that may be connected to PLC 402. For example, input module 404 may provide a connection for temperature or pressure measurements, valve or machine status, tank level status, user input through a keyboard, a mouse, and/or any other suitable input device. Output module 408 may send output to an actuator, indicator, motor controller, printer, machine, display, alarms and/or any other suitable output device.

C. Illustrative Method

Figure 7:
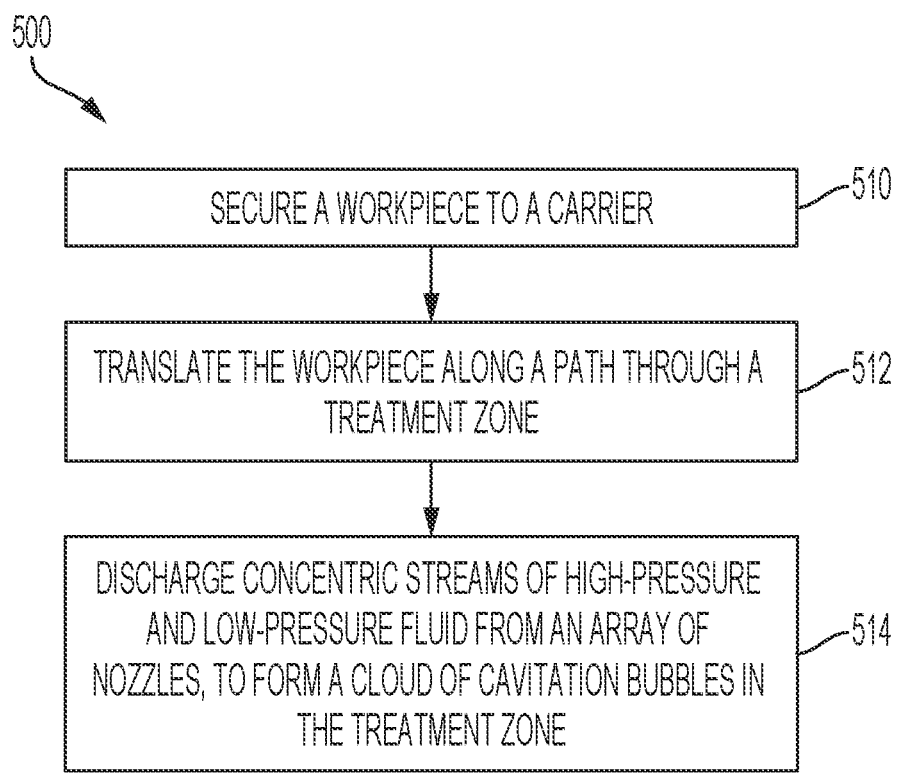
FIG. 7 is a flow chart depicting steps of an illustrative method for automated cavitation processing according to the present teachings.

This section describes steps of an illustrative method for automated cavitation peening; see FIG. 7. Aspects of cavitation processing systems and apparatus described above may be utilized in the method steps described below. Where appropriate, reference may be made to components and systems that may be used in carrying out each step. These references are for illustration, and are not intended to limit the possible ways of carrying out any particular step of the method.

FIG. 7 is a flowchart illustrating steps performed in an illustrative method, and may not recite the complete process or all steps of the method. Although various steps of method 500 are described below and depicted in FIG. 7, the steps need not necessarily all be performed, and in some cases may be performed simultaneously or in a different order than the order shown.

At step 510, the method includes securing a workpiece to a carrier. The workpiece may be any part, component, or object needing cavitation peening, cavitation abrasive surface finishing, and/or other cavitation processing. For example, the workpiece may be an aluminum aircraft wing skin requiring peening, a titanium engine wall part requiring alpha case removal, or an additively manufactured spacecraft panel requiring surface smoothing. In some examples, the method may include securing a plurality of workpieces to the carrier, or securing one or more workpieces to each of a plurality of carriers.

The carrier may include an automated and/or powered mechanical manipulation device such as a crane, conveyer belt, industrial robot, or computer controlled actuator. The carrier may also include a material handing device such as a rack, hanger, hook, and/or straps to secure the workpiece to the manipulation device. The mechanical manipulation device of the carrier may be in wired or wireless communication with a programmable electronic controller, such that the controller can signal the manipulation device to move the secured workpiece.

Step 512 of the method includes translating the workpiece along a path through a treatment zone. The workpiece may be translated by the carrier, according to instructions from the controller. The path may be linear, or may have a complex three-dimensional geometry. The workpiece may be translated at a constant rate, or may stop, start, accelerate and/or decelerate. The workpiece may be translated up and/or down, left and/or right, forward and/or back, and/or rotated.

The path may also be described as a sequence of movements. For example, the workpiece may be moved horizontally forward at a constant speed. For another example, the workpiece may be lowered into the treatment zone, rotated at a constant speed, and then translated forward to pause for a selected duration. The path may be selected according to shape and geometry or other properties of a workpiece, and desired treatment of the workpiece. The path or sequence of movements may be programmed into the electronic controller, for consistent and exact repetition.

The treatment zone may be defined by a plurality of cavitation nozzles, the cavitation clouds generated by the nozzles, and/or a fluid environment for cavitation. For example, the treatment zone may comprise a region between two arrays of cavitation nozzles and/or may comprise a tank filled with fluid.

At step 514, the method includes discharging concentric streams of high-pressure and low-pressure fluid from an array of nozzles, to form a cloud of cavitation bubbles in the treatment zone. The nozzles of the array may be co-flow cavitation nozzles, including an outer channel to discharge an outer stream of low-pressure fluid, and an inner nozzle to discharge a cavitating jet of high-pressure fluid. Each nozzle may generate cavitation bubbles, which may combine to form a cloud of bubbles. In some examples, the low-pressure fluid discharged in step 514 may be a slurry of an abrasive media and a liquid, for cavitation abrasive surface finishing.

The array of nozzles may be oriented toward the treatment zone, and adjacent and/or surrounding the treatment zone. The nozzles of the array may be positioned and/or oriented to achieve desired cavitation intensity. For example, the nozzles may be positioned between approximately one and twelve inches from the workpiece's path through the treatment zone, to facilitate an appropriate standoff distance during treatment. For another example, one or more nozzles may be obliquely angled relative to the treatment path, in order to appropriately treat an angled surface of the workpiece.

In some examples, the method may include moving or adjusting the nozzles prior to and/or during the discharging step. In other words, positions of the nozzles may be adjusted prior to treatment or the nozzles may be configured to move during treatment. In some examples, the workpiece may be secured to a stationary support throughout treatment and the nozzles may be directed to move according to a sequence programmed into the controller. In some examples, the nozzles may be adjusted to a layout designed for a workpiece, prior to treatment of a plurality of identical such workpieces.

Method 500 may be repeated, to process of a large number of workpieces. The method may be automated such that the method can be completed with little to no user action required, subsequent to setup. That is, a user may program the controller to execute the method and/or steps 512 and 514 of the method.

Illustrative Combinations and Additional Examples

This section describes additional aspects and features of automated cavitation processing systems, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An apparatus for treating a surface of an object, comprising:
a carrier configured to transport an object through a treatment zone,
an array of nozzle devices, each nozzle device positioned to deliver a cavitating jet into the treatment zone,
a fluid source,
a pump connected to the fluid source, and
a hose configured to carry fluid, under high pressure generated by the pump, from the fluid source to the array of nozzle devices.

A1. The apparatus of A0, wherein each of the nozzle devices includes a first channel and a second channel, the first channel being configured to dispense fluid at a higher pressure than the second channel.

A2. The apparatus of A1, wherein the first and second channels are concentric.

A3. The apparatus of A1 or A2, wherein the second channel is configured to dispense fluid comprising water and abrasive particles.

A4. The apparatus of A3, wherein nozzle devices in the array of nozzle devices are configured to dispense abrasive particles having different grit sizes.

A5. The apparatus of A4, wherein the abrasive particle grit size dispensed by the array of nozzle devices decreases as the object moves through the treatment zone.

A6. The apparatus of any of A0-A5, wherein the array of nozzle devices includes at least one nozzle device on each of opposing sides of the treatment zone.

A7. The apparatus of any of A0-A6, wherein the array of nozzle devices includes at least one nozzle device on a top side of the treatment zone.

A8. The apparatus of any of A0-A7, wherein the array of nozzle devices includes at least one nozzle device on a bottom side of the treatment zone.

A9 The apparatus of any of A0-A8, wherein the carrier is configured to transport the object continuously along a linear path through the treatment zone.

A10. The apparatus of A9, wherein the linear path is horizontal.

A11. The apparatus of A9 or A10, wherein the linear path is vertical.

A12. The apparatus of any of A0-A11, wherein the carrier is configured to rotate the object in the treatment zone.

A13. The apparatus of any of A0-A12, further comprising a controller programmed to control movement of the carrier during a treatment procedure.

A14. The apparatus of A13, further comprising one or more sensors configured to detect a parameter of the object in the treatment zone, the controller being programmed to alter movement of the carrier through the treatment zone based on a parameter sensed by the one or more sensors.

A15. The apparatus of any of A0-A14, wherein the hose is connected to the array of nozzle devices via a manifold, the manifold having an intake valve connected to a distal end of the hose, and a plurality of outtake valves, each outtake valve being connected to one of the nozzle devices.

B0. A cavitation peening system, comprising:
a plurality of cavitation nozzles directed toward a treatment zone and connected by high-pressure hoses to a high-pressure fluid pump,
a rack configured to support and releasably secure a workpiece,
a mechanical manipulation device connected to the rack and configured to move the rack and the secured workpiece into the treatment zone, and
a controller electronically connected to the high-pressure fluid pump and the mechanical manipulation device,
wherein the controller coordinates supply of a high-pressure fluid from the high-pressure fluid pump to the plurality of cavitation nozzles and movement of rack by the mechanical manipulation device to achieve cavitation peening of the secured workpiece.

B1. The system of B0, wherein the treatment zone is in a tank filled with a fluid.

B2. The system of B0 or B1, wherein the rack is configured to support and releasably secure a plurality of workpieces.

B3. The system of any of B0-B2, wherein the mechanical manipulation device includes one of (a) a conveyor belt, (b) an overhead crane, (c) a multi-axis robotic arm.

B4. The system of any of B0-B3, further including an abrasive media supply.

B5. The system of any of B0-B4, wherein the high-pressure fluid is water.

C0. An automated cavitation peening system, comprising:
a first array of cavitation nozzles positioned along a first side of a treatment zone,
a second array of cavitation nozzles positioned along a second, opposing side of the treatment zone, the cavitation nozzles of the first and second arrays being directed toward the treatment zone,
a fluid supply including a pump connected to at least a first and a second manifold, and supplying high-pressure fluid to the first array of cavitation nozzles and the second array of cavitation nozzles,
a movable hanger configured to support a workpiece during cavitation peening,
a controller regulating the supply of high-pressure fluid, and directing movement of the movable hanger,
wherein the movable hanger carries the supported workpiece along a path through the treatment zone, between the first and second sides.

C1. The system of C0, wherein the cavitation nozzles of the first and second arrays are co-flow nozzles, configured to generate a cloud of cavitation bubbles in an air environment.

C2. The system of C1, wherein the fluid supply further supplies low-pressure fluid to the first and second arrays of cavitation nozzles.

C3. The system of C2, wherein the low-pressure fluid is a slurry of water and abrasive media.

C4. The system of any of C0-C3, further including an abrasive media supply connected to the first and second arrays of cavitation nozzles, wherein the cavitation nozzles are configured to dispense supplied abrasive media into the treatment zone.

C5. The system of C4, further including a re-capture system configured to collect dispensed abrasive media and process the collected abrasive media for re-use.

C6. The system of any of C0-C5, wherein the high-pressure fluid is water.

D0. A method of cavitation peening, comprising:
securing a workpiece to a carrier,
translating the workpiece along a path through a treatment zone, and
discharging concentric streams of high-pressure fluid and low-pressure fluid from an array of nozzles, to form a cloud of cavitation bubbles in the treatment zone.

D1. The method of D0, wherein the translating step includes at least one of (a) vertical movement, (b) rotation, or (c) remaining stationary for a selected duration.

D2. The method of D0 or D1, wherein the low-pressure fluid is a slurry of an abrasive and a liquid.

D3. The method of any of D0-D2, wherein the translating step includes communicating a plurality of directions to a carrier from an electronic controller.

D4. The method of D3, further including altering the plurality of directions communicated to the carrier in response to sensor data received by the electronic controller.

D5. The method of D4, wherein the discharging step includes communicating a further plurality of directions to at least one control valve to initiate supply of fluid to the array of nozzles.

D6. The method of any of D0-D5, further including moving the nozzles of the array of nozzles during the discharging step.

Advantages, Features, and Benefits

The different examples of the automated cavitation processing apparatus, systems, and methods described herein provide several advantages over known solutions for peening and surface finishing. For example, illustrative examples described herein allow fully automated processing.

Additionally, and among other benefits, illustrative examples described herein allow efficient processing of large-scale parts.

Additionally, and among other benefits, illustrative examples described herein allow safe and cost effective part finishing, including peening, cleaning, smoothing, and material removal.

Additionally, and among other benefits, illustrative examples described herein allow configuration and/or reconfiguration for a wide range of part types and geometries.

Additionally, and among other benefits, illustrative examples described herein provide automated surface finishing for additively manufactured parts.

No known system or device can perform these functions, particularly with consistent and repeatable results. Thus, the illustrative examples described herein are particularly useful for production scale implementation. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An apparatus for treating a surface of an object, comprising:
a carrier configured to transport the object through a treatment zone;
nozzle devices, wherein each nozzle device is positioned to deliver a cavitating jet into the treatment zone, wherein each of the nozzle devices includes a first channel and a second channel concentric with the first channel, and wherein the nozzle devices comprise:
a first array positioned on a first side of the treatment zone; and
a second array positioned on a second side of the treatment zone opposite the first side;
a fluid source comprising a tank of water and a supply of abrasive media;
a first pump connected to the fluid source and configured to deliver water at a first pressure to the first channel of the nozzle devices;
a second pump connected to the fluid source and configured to deliver water at a second pressure to the second channel of the nozzle devices, wherein the second pressure is lower than the first pressure; and
a third pump connected to the fluid source and configured to deliver water and abrasive media at a third pressure to the nozzle devices, wherein the third pressure is lower than the first pressure; and
hoses configured to carry fluid from the fluid source to the nozzle devices;
wherein the apparatus is configured to switch between:
a cavitation peening mode, in which the first channel of the nozzle devices delivers water into the treatment zone, and the second channel of the nozzle devices delivers water into the treatment zone; and
a cavitation abrasive surface finishing mode, in which the first channel of the nozzle devices delivers water into the treatment zone, and the second channel of the nozzle devices delivers water and abrasive media into the treatment zone.

2. The apparatus of claim 1, wherein the nozzle devices further comprise a third array positioned on a top side of the treatment zone.

3. The apparatus of claim 1, wherein the carrier is configured to transport the object continuously along a linear path through the treatment zone.

4. The apparatus of claim 3, wherein the linear path is horizontal.

5. The apparatus of claim 1, wherein the carrier is configured to rotate the object in the treatment zone.

6. The apparatus of claim 1, further comprising a controller programmed to control movement of the carrier during a treatment procedure.

7. The apparatus of claim 6, wherein the controller is further programmed to regulate supply of fluids to the nozzle devices.

8. The apparatus of claim 6, further comprising one or more sensors configured to detect a parameter of the object in the treatment zone, the controller being programmed to alter movement of the carrier through the treatment zone based on the parameter.

9. The apparatus of claim 1, wherein the carrier comprises a movable hanger configured to support the object.

10. The apparatus of claim 1, further including a re-capture system configured to collect dispensed abrasive media and process collected abrasive media for re-use.

11. The apparatus of claim 1, wherein the nozzle devices further comprise a third array positioned on a bottom side of the treatment zone.

12. The apparatus of claim 1, further comprising:
a first manifold configured to deliver fluids to the first array of nozzle devices;
a second manifold configured to deliver fluids to the second array of nozzle devices;
a first conduit structure configured to deliver fluids from the fluid source to the first manifold; and
a second conduit structure configured to deliver fluids from the fluid source to the second manifold.

13. The apparatus of claim 12,
wherein the first conduit structure comprises:
a first conduit first water hose for delivery of water at a first pressure to the first manifold;
a first conduit slurry hose for delivery of water and abrasive media at a third pressure to the first manifold;
a first conduit second water hose for delivery of water at a second pressure to the first manifold; and
wherein the second conduit structure comprises:
a second conduit first water hose for delivery of water at the first pressure to the second manifold;
a second conduit slurry hose for delivery of water and abrasive media at the third pressure to the second manifold;
a second conduit second water hose for delivery of water at the second pressure to the second manifold.

14. The apparatus of claim 13, wherein the first pressure is between 1,000 and 22,000 psi, and wherein the second pressure and the third pressure are at or below 50 psi.

15. The apparatus of claim 1, wherein the apparatus is configured to deliver abrasive media of different grit sizes to different ones of the nozzle devices.

16. The apparatus of claim 15, wherein the apparatus is configured to deliver abrasive media of decreasing size along the first and second arrays of nozzle devices in a direction of movement of the object through the treatment zone.

17. The apparatus of claim 1, wherein the fluid source comprises a supply of a slurry of water and abrasive media, and wherein the second channel of the nozzle devices is configured to deliver the slurry.

18. The apparatus of claim 1, further comprising:
a sensor;
wherein the nozzle devices are configured to produce a cavitation cloud throughout the treatment zone; and
wherein the sensor is configured to monitor cavitation intensity within the cavitation cloud.

19. A system comprising:
the apparatus of claim 1; and
the object positioned in the treatment zone, wherein the object is an additively-manufactured object.

20. The apparatus of claim 19, wherein the object has a curvature, and wherein the nozzle devices are configured to produce a homogeneous cavitation cloud throughout the treatment zone.

* * * * *